US012272910B1

(12) United States Patent
McCarty et al.

(10) Patent No.: US 12,272,910 B1
(45) Date of Patent: Apr. 8, 2025

(54) POWER DISTRIBUTION BLOCK

(71) Applicants: Justin McCarty, New Braunfels, TX (US); Wesley Murrie, Kyle, TX (US)

(72) Inventors: Justin McCarty, New Braunfels, TX (US); Wesley Murrie, Kyle, TX (US)

( * ) Notice: Subject to any disclaimer, the term of this patent is extended or adjusted under 35 U.S.C. 154(b) by 0 days.

(21) Appl. No.: 18/947,853

(22) Filed: Nov. 14, 2024

Related U.S. Application Data

(60) Provisional application No. 63/607,916, filed on Dec. 8, 2023.

(51) Int. Cl.
*H01R 13/03* (2006.01)
*H01R 13/52* (2006.01)
*H01R 25/16* (2006.01)

(52) U.S. Cl.
CPC ........... *H01R 25/167* (2013.01); *H01R 13/03* (2013.01); *H01R 13/5213* (2013.01); *H01R 25/162* (2013.01)

(58) Field of Classification Search
None
See application file for complete search history.

(56) References Cited

U.S. PATENT DOCUMENTS

| | | | | |
|---|---|---|---|---|
| 6,551,141 | B2 * | 4/2003 | Liang | H01H 85/2035 439/830 |
| 6,753,754 | B1 * | 6/2004 | Black | H01R 9/245 337/214 |
| 9,306,379 | B2 | 4/2016 | Greenberg | |
| 9,933,147 | B2 | 4/2018 | Wang et al. | |
| 11,837,826 | B2 * | 12/2023 | Young | H01R 25/162 |

* cited by examiner

*Primary Examiner* — Tho D Ta
(74) *Attorney, Agent, or Firm* — HULSEY P.C.

(57) ABSTRACT

A power distribution block for distributing electrical power is disclosed. The power distribution block includes a plate made of a conductive material. The plate is configured to operate at 1200 amperage and 600 volts. The plate includes holes of various sizes arranged in series. The holes are configured to mount connectors or conductive blocks to the plate in different configurations depending on the need for distribution of the electrical power. Each connector is rated for specific current-carrying capacity. Further, each connector includes at least one input terminal and multiple output terminals, enabling the distribution of electrical power to different loads while maintaining secure and low-resistance connections. The power distribution block includes a cover configured to be placed over the plate to protect the plate and the connectors from environmental factors, physical damage and accidental contact. The power distribution block presents a high-capacity terminal block adaptable to various electrical applications.

20 Claims, 5 Drawing Sheets

POWER DISTRIBUTION BLOCK

CROSS-REFERENCE TO RELATED APPLICATIONS

The present application claims the benefit of provisional Application No. 63/607,916, filed Dec. 8, 2023; all of which is incorporated herein in its entirety and referenced thereto.

BACKGROUND OF THE INVENTION

Field of the Invention

The present invention relates to power distribution blocks. More specifically, the present invention relates to a power distribution block for distributing electrical power within an electrical system.

Description of the Prior Art

It is known that power distribution blocks are used for distributing electrical power from a single source to multiple circuits or loads. The power distribution blocks help to simplify the wiring and organization of power connections. Typically, a power distribution block includes a non-conductive base and one or more conductive blocks or bars for connecting wires.

Several power distribution block designs have been disclosed in the past. One such example is disclosed in a U.S. Pat. No. 9,306,379, entitled “Fuse and power distribution block” (“the ’379 Patent”). The ’379 Patent discloses a fuse and power distribution block including a polymer base, and multiple conductive base blocks for connection with incoming power lines or outgoing accessory lines. Each conductive base block also provides multiple alternative fuse connections on a first upper horizontal platform, a second lower horizontal platform, and a third intermediate vertical platform interconnecting the first and second platforms. The fuse and power distribution block may, depending on the desired accessory system, include 4 or 6 conductive base blocks. The fuse and power distribution block has an attractive transparent polymer cover and shell.

Another example is disclosed in a U.S. Pat. No. 9,933,147, entitled “Terminal block assembly” (“the ’147 Patent”). The ’147 Patent discloses a terminal block assembly including a block housing, a surge protection device, a plurality of cable-receiving seats, a plurality of connector sets and a first fuse. The block housing defines an accommodating space that confines the surge protection device. The cable-receiving seats and the connector sets are mounted on the block housing. Each of the connector sets includes at least one first connector that is electrically connected to a light-emitting module of an outdoor lamp, and a second connector that extends into the accommodating space and that is electrically connected to the surge protection device. The first fuse is mounted to the block housing, and is electrically connected to the surge protection device.

Although the above discussed power distribution blocks are useful, they have few problems. For instance, most of the existing power distribution blocks are designed for specific amperage ratings. As a result, they cannot be used for higher amperage ratings. If one were to use the power distribution blocks for operating at different amperage ratings, then multiple power distribution blocks, each operating at different amperage ratings are needed. Operating the power distribution blocks with different amperages may lead to various issues, ranging from safety hazards to equipment damage. As most of the existing power distribution blocks are standard designs or pre-fabricated distribution blocks, they cannot be customized for power distribution from a greater amperage to multiple smaller amperage applications.

In some cases, power distribution blocks such as Insul-Tap™ connectors offered by Polaris™ are used for connecting two wires. The dual sided connector offers a secure connection between two conductors in applications such as cable trays, panel boards, ducts, raceways or troughs. The connectors are dual rated for use with copper and/or aluminum cables and are capable of operating at 600 volts. Further, the connectors are capable of operating up to max of 135-170 amperes (amps). Generally, it is not possible to reconfigure the connectors as they are pre-custom built. Alternatively, bussed gutters may be used for power distribution over 800 amps. However, it is very expensive to configure the bussed gutters to operate at 800-1200 amp power distribution.

Therefore, there is a need in the art to provide an improved power distribution block that can be customized for distributing electrical power from a greater amperage (say in the range of 1200 amps) to multiple smaller amperage applications.

SUMMARY OF THE INVENTION

It is an object of the present invention to provide a power distribution block for distributing electrical power and that avoids the drawbacks of known power distribution blocks.

It is another object of the present invention to provide a power distribution block that can be customized for distributing electrical power from a greater amperage to multiple smaller amperage applications.

In order to overcome one or more objects, the present invention presents a power distribution block for distributing electrical power. The power distribution block includes a plate made of a conductive material. The plate includes holes such as first holes and second holes of various sizes. The holes are configured to mount connectors or conductive blocks to the plate in different configurations depending on the need for distribution of the electrical power. Each connector is rated for specific current-carrying capacity. The conductive block includes an input terminal and multiple (at least two, or two or more) output terminals. The conductive block is connected in one or more configurations via the first holes and the second holes. The conductive block receives electrical power via the input terminal and distributes the electrical power equally among the output terminals.

In one aspect, the power distribution block includes a cover configured to be placed over the plate to protect the plate and the connectors from environmental factors, physical damage and accidental contact.

In another aspect, the plate includes legs on all four corners that are rated for 1000 volts.

In one advantageous feature of the present invention, the power distribution block is customizable and can be installed in the electrical field to the exact specifications needed to complete the job safely and properly. The power distribution block includes a plate that is a ¼ inch by 5 inches wide by 10 inches long copper bus bar. The design has an insulated base to raise and separate the copper bus from the metal gutter. The plate is rated for up to 1200 amps and over 600 volts. The bus bar/plate includes a series of drilled holes of tapped with ⅜ inch and ¼ inch threads to allow torquing to the mechanical lugs for a secure fit. The holes are spaced and placed to have a series of ¼" holes that allow turning the mechanical lugs/conductive blocks in any direction for a true customizable application. In other words, the holes allow the connectors or mechanical lugs to mount in various ways, providing electricians with the freedom to customize the configuration according to specific requirements. The series of ⅜" holes are spaced to fit up to one (1) two hole lug and one (1) one hole lug in any direction on each side depending on the need. In one example, it is possible to provide two 6" and two 12" shields clipped onto the plastic base for protection in any direction to avoid the wires from traveling or protruding out.

The holes allow electricians to mount multiple connectors or mechanical lugs in whichever format they choose. The electricians can use the exact mechanical lugs for their application by connecting them to the plate and have their power distributed precisely as needed. Further, the mechanical lugs can be connected as needed i.e., the wires coming in and out can be organized very cleanly.

In another advantageous feature of the present invention, the power distribution block offers a customizable and cost-effective design that prevents longer wait times on custom power distribution. The power distribution block bypasses having a "one size fits all" distribution and provides a 1200 amp distribution block for two parallel runs of 500 MCM in one parallel 350 out and 3 sets off parallel 2/0 for 1200amps in, 600amps one way and 200 amps 3 other ways. Unlike Insul-Tap™ connectors offered by Polaris™, which offers a fixed configuration such as 12 or 14-port 500 MCM with oversized ports, the presently disclosed power distribution block offers to customize the connector/conductor block setup, eliminating wasted space and resources.

The features and advantages of the invention here will become more apparent in light of the following detailed description of selected embodiments, as illustrated in the accompanying FIGURES. As will be realized, the invention disclosed is capable of modifications in various respects, all without departing from the scope of the invention. Accordingly, the drawings and the description are to be regarded as illustrative in nature.

DETAILED DESCRIPTION OF THE PREFERRED EMBODIMENT

The following detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed power distribution block. However, it will be apparent to those skilled in the art that the presently disclosed invention may be practiced without these specific details. In some instances, well-known structures and devices are shown in functional or conceptual diagram form in order to avoid obscuring the concepts of the presently disclosed power distribution block.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention provides a description of a power distribution block integrated, it is to be further understood that numerous changes may arise in the details of the embodiments of the power distribution block. It is contemplated that all such changes and additional embodiments are within the spirit and true scope of this disclosure.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure.

Various features and embodiments of a power distribution block that can be customized for distributing electrical power from a greater amperage to multiple smaller amperage applications are explained in conjunction with the description of FIGUREs (FIGS.) 1-7.

Figure 1:
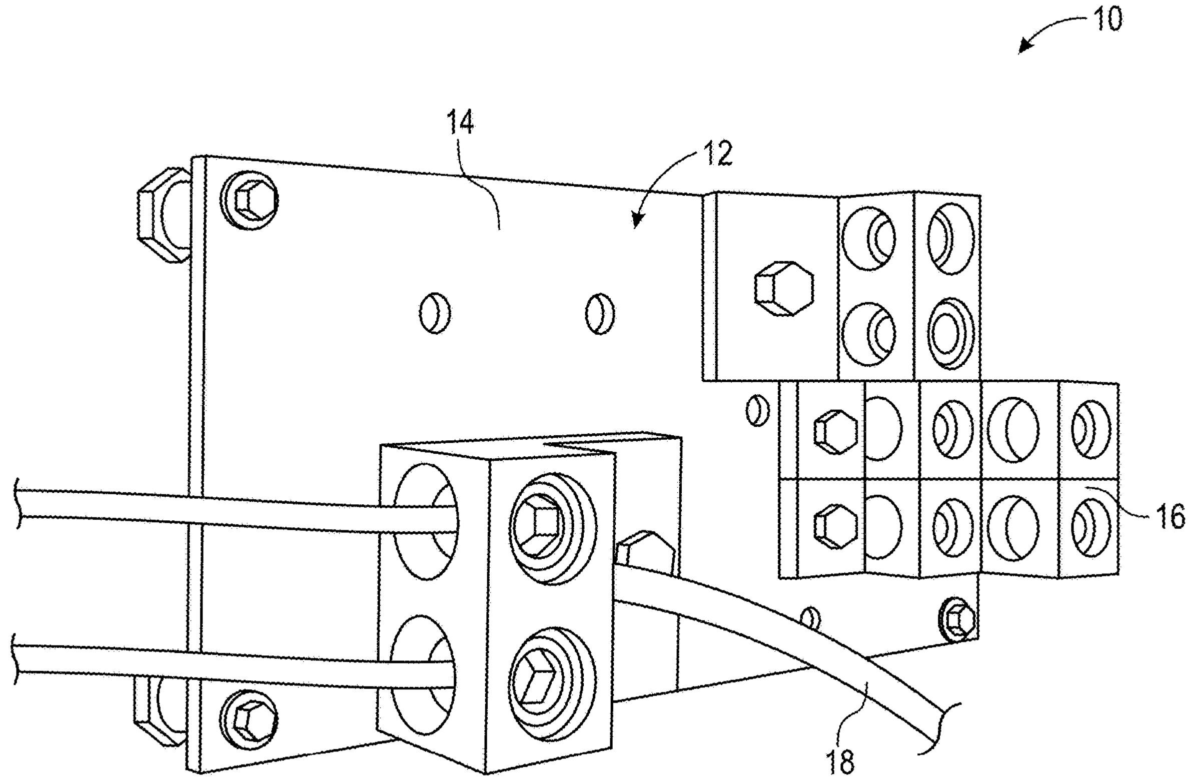
FIG. 1 illustrates an environment in which a power distribution block implements, in accordance with one embodiment of the present invention.
Figure 2A:
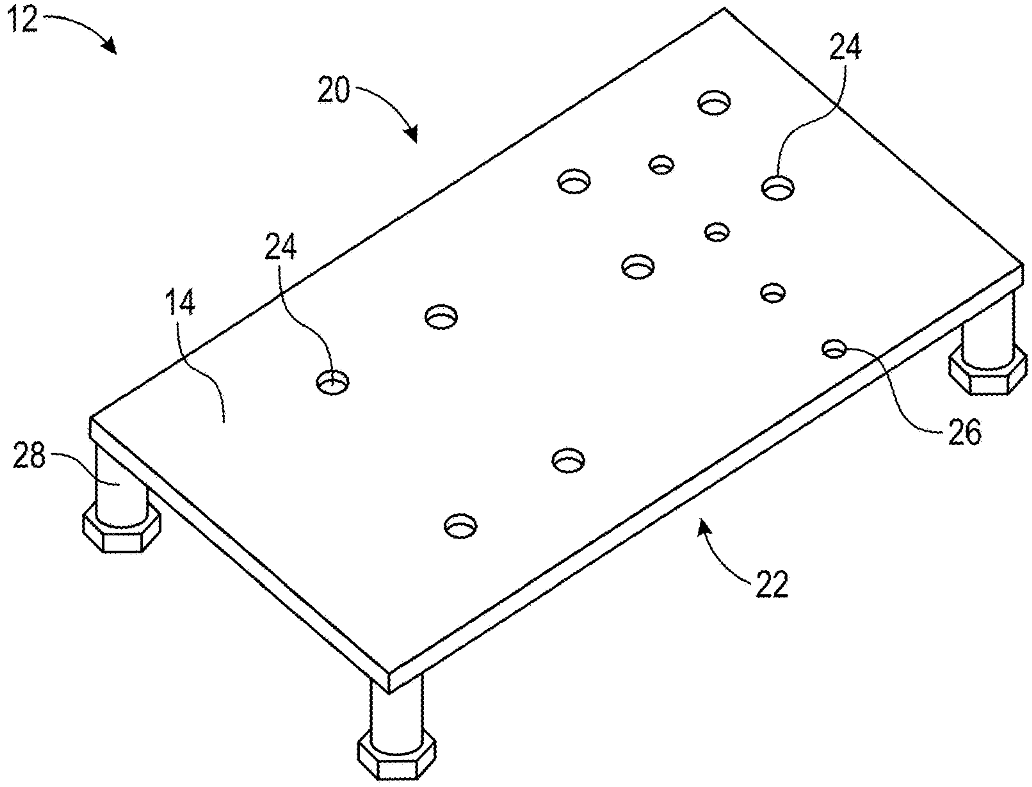
FIG. 2A and FIG. 2B illustrate a top perspective view and a bottom perspective view, respectively of the power distribution block, in accordance with one embodiment of the present invention.
Figure 2B:
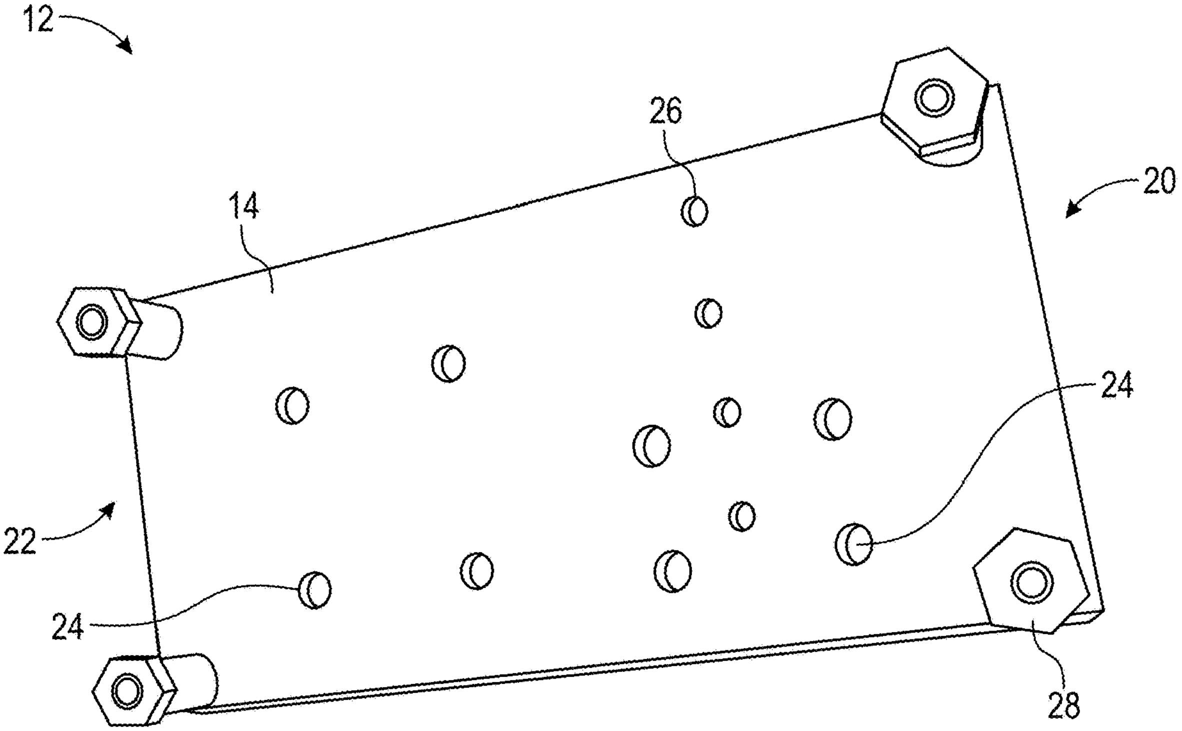

FIG. 1 shows an environment 10 in which a power distribution block 12 implements, in accordance with one embodiment of the present invention. Power distribution block 12 includes a plate 14 holding one or more connectors 16 for distributing power via cables or wires 18. FIG. 2A and FIG. 2B show a top perspective view and a bottom perspective view, respectively, of power distribution block 12, in accordance with one embodiment of the present invention. Power distribution block 12 includes plate 14 made of a conductive material and comes in a flat configuration. As can be seen from FIG. 2A, plate 14 comes in a rectangular configuration. In one example, plate 14 indicates a bus bar that is 5 inches wide and 10 inches long and has a thickness of ¼th inch. A person skilled in the art understands that it is possible to provide plate 14 in a square or any other configuration depending on the need. Plate 14 is configured to operate 1200 amperage (amps) rating and over 600 volts.

Plate 14 has a top end 20 and a bottom end 22. Plate 14 has first holes 24 and second holes 26. Each of first holes 24 is ¼ inch, and each of second holes 26 is ⅜ inch. In one example, first holes 24 are positioned in a series, and second holes 26 are positioned in a series. In one example, first holes 24 are larger in size than second holes 26, or vice versa. In the present invention, first holes 24 and second holes 26 are positioned to provide the opportunity to an electrician to mount inside an electrical gutter and install multiple connectors or mechanical lugs 16 in whichever format they choose.

Figure 3A:
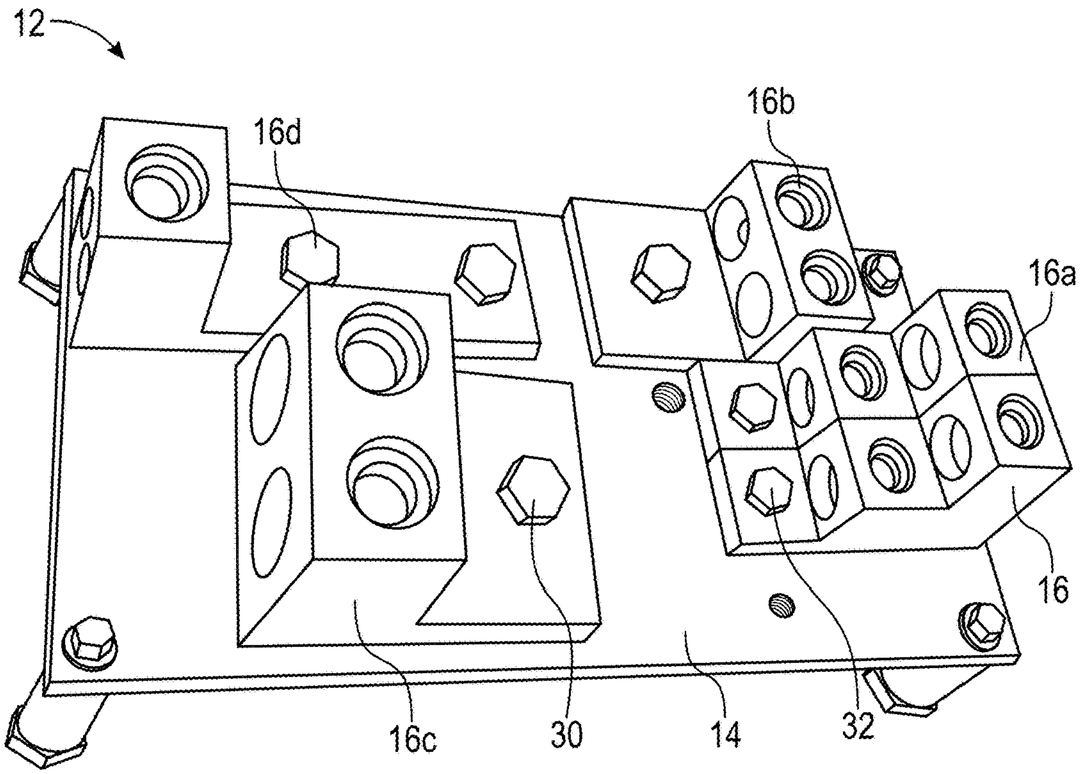
FIG. 3A and FIG. 3B illustrate a top perspective view and a bottom perspective view, respectively of the power distribution block having multiple connectors or mechanical lugs, in accordance with one embodiment of the present invention.
Figure 3B:
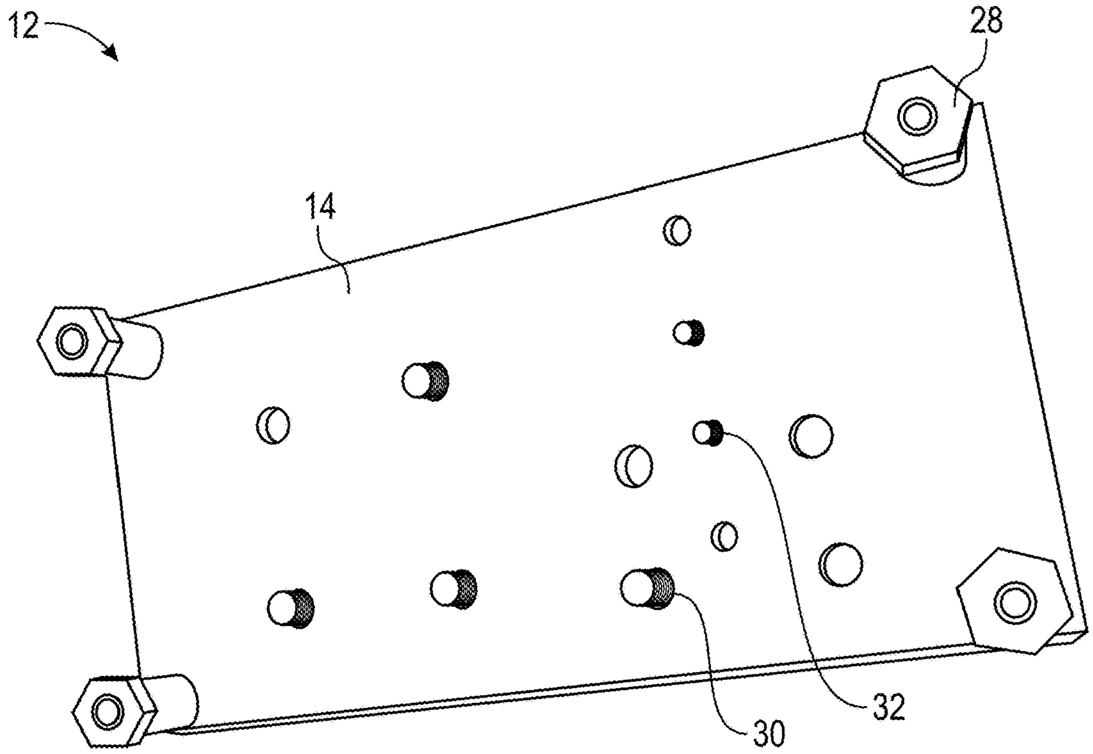

FIG. 3A and FIG. 3B show a top perspective view and a bottom perspective view, respectively of power distribution block 12 having connectors 16. In one example, connectors 16 indicate mechanical lugs made up of aluminum, copper, or tin-plated copper, depending on the application and the conductivity requirements. In other words, connectors 16 indicate conductive blocks. Connectors 16 have a clamp or compression design to grip and connect electrical conductors. In one example, each connector 16 includes a screw to secure terminated wire 18. As specified above, connectors 16 come in various sizes and allow to connect wires of various capacities. Connectors 16 include one or more connectors 16 secured to plate 14 at first holes 24 and second holes 26 via first screws 30 and second screws 32, respectively.

One or more connectors 16 include a first connector 16*a*, a second connector 16*b*, a third connector 16*c* and a fourth connector 16*d*, collectively termed connectors 16 or simply connector 16. Connectors 16 come in various sizes and current carrying capacities to accommodate different applications. In one example, first connector 16*a* is configured to carry approximately 1000 amperes. In another example, first connector 16*a* is configured to carry approximately 100 amperes. In the present invention, the greater amperage that all connectors 16 can carry is 1200 amperes. When multiple connectors 16 are used, and they are distributed into different smaller amperages to a maximum of 1200 amperes i.e., plate's 14 1200 amperage (amps) rating and over 600 volts.

Figure 4:
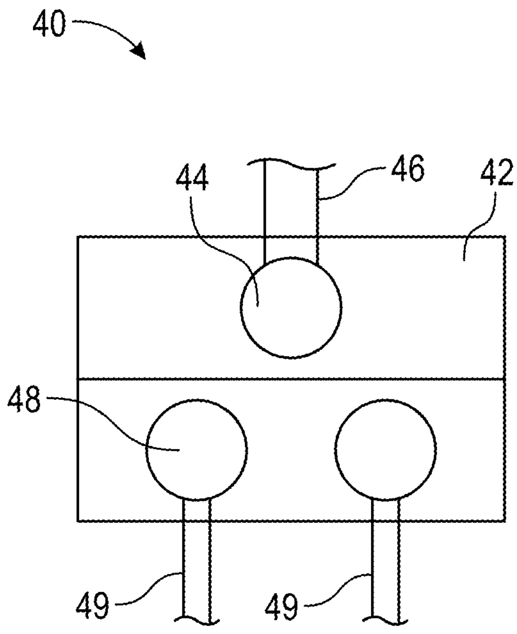
FIG. 4 illustrates a circuit diagram of a connector, in accordance with one embodiment of the present invention.

Each connector 16 includes at least one input terminal and two or more output terminals for distributing the incoming electrical power. FIG. 4 shows a circuit diagram 40 of a connector 42, in accordance with one exemplary embodiment of the present invention. Circuit diagram 40 presents connector 42 having an input terminal 44 for receiving an input wire 46. Here, input terminal 44 indicates a point where the incoming electrical power (input wire 46) is connected to connector 42 (power distribution block 12). Connector 42 includes two output terminals 48 for receiving output wires 49. Output terminals 48 indicate points where the electrical power is distributed to individual loads or circuits. In other words, two or more (multiple) output terminals 48 allow for branching out of the electrical power to different devices or components. In one example, consider input wire 46 via input terminal 44 supplies 1000 amperes (amps) and 230 Volts (V), then each output terminal of two output terminals 48 is configured to distribute 500 amperes (amps) and 230 Volts (V). It should be understood that connector 42 includes screws (e.g., set screws) or clamps to secure input wires 46 to input terminal 44 and output wires 49 to output terminals 48 ensuring a reliable and secure electrical connection. The tightness of the connection prevents overheating and maintains a low-resistance path for current flow.

Figure 5:
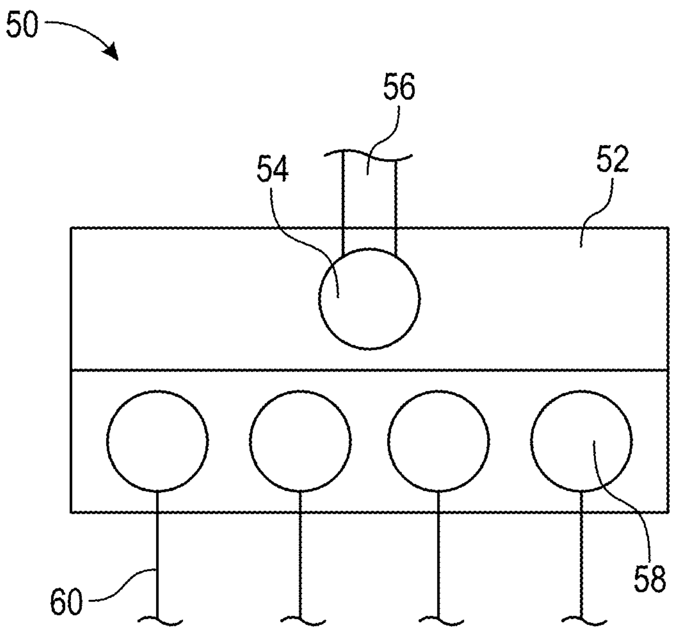
FIG. 5 illustrates a circuit diagram of a connector, in accordance with another embodiment of the present invention.

FIG. 5 shows a circuit diagram 50 of a connector 52, in accordance with another exemplary embodiment of the present invention. Circuit diagram 50 includes a connector 52 having an input terminal 54 for receiving an input wire 56. Further, connector 52 includes four output terminals 58 for receiving output wires 60. In one example, consider input wire 56 via input terminal 54 supplies 600 amperes (amps) and 230 Volts (V), then each output terminal of four output terminals 58 is configured to distribute 150 amperes (amps) and 230 Volts (V). In accordance with the present invention, plate 14 is designed to operate 1200 amperage (amps) rating and over 600 volts. As a result, the presently disclosed power distribution block 12 is capable of handling the distribution of electrical power safely without overheating and other related issues.

Referring back to FIG. 2A and FIG. 2B, plate 14 includes legs 28. Legs 28 extend downwards towards bottom end 22 from all corners of plate 14, as can be seen from FIG. 2B. Legs 28 are made up of insulated material and are rated for up to 1000 volts.

Figure 6:
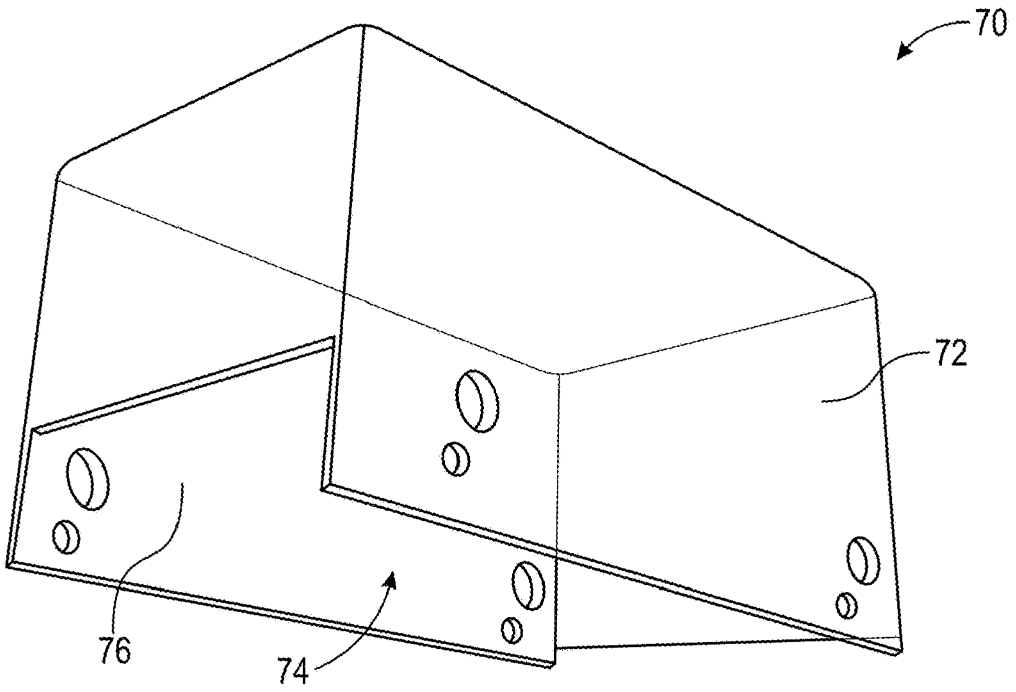
FIG. 6 illustrates a perspective view of a cover, in accordance with another embodiment of the present invention.
Figure 7:
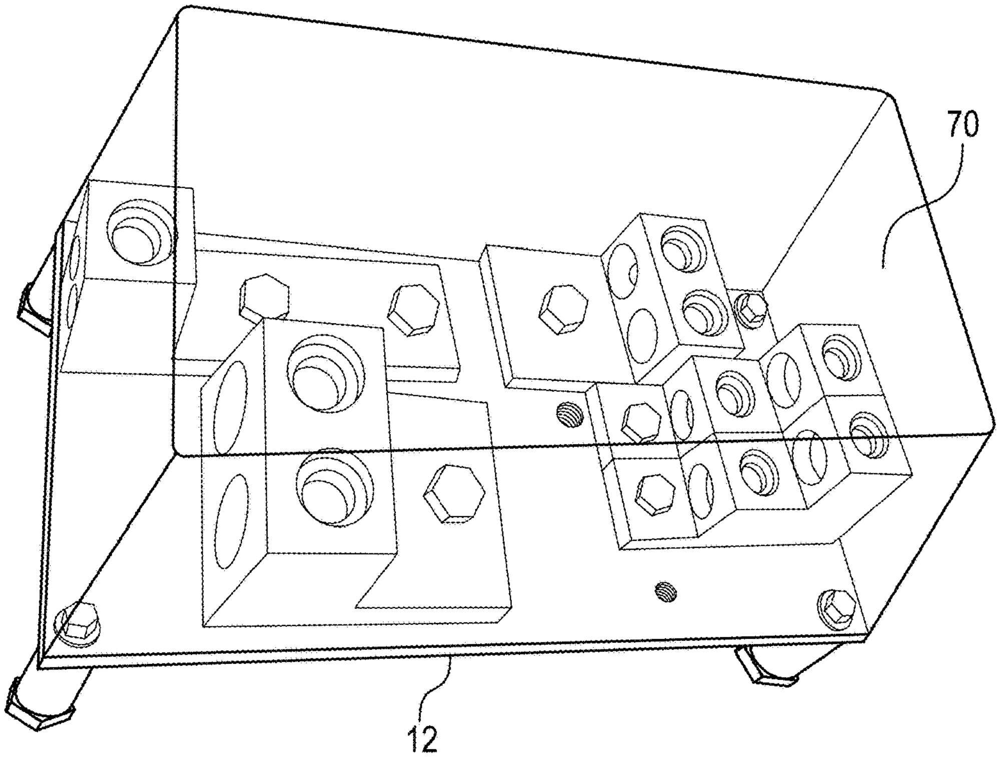
FIG. 7 illustrates the cover placed on the power distribution block, in accordance with another embodiment of the present invention.

In one implementation, power distribution block 12 includes a cover 70, as shown in FIG. 6. Cover 70 is made of polycarbonate or any other suitable material. In one example, cover 70 presents a durable and transparent thermoplastic material. Cover 70 includes a housing 72 having a cover opening 74 at the bottom. At one end of the side wall, housing 72 includes a cut-section 76. In the present invention, cover 70 is placed over power distribution block 12 as shown in FIG. 7. When cover 70 is placed over power distribution block 12, ends of cover 70 sit over the edges of plate 14 such that connectors 16 are made to position within cover opening 74. Cover 70 positions over power distribution block 12 and acts as a protective enclosure to protect power distribution block 12 and connectors 16 from environmental factors, physical damage and accidental contact. In order to uninstall cover 70 from power distribution block 12, a user uses cut-section 76 to lift cover 70 off from power distribution block 12.

The presently disclosed power distribution block provides several advantages over the prior art. The power distribution block presents a single plate designed to operate a higher amperage rating such as 1200 amperage (amps) rating and over 600 volts. This allows the power distribution block to connect multiple connectors to distribute electrical power. A single power distribution block allows to connect more than two connectors of higher amperage rating without requiring multiple power distribution blocks as in the known art. The presently disclosed power distribution block avoids use of multiple power distribution blocks operating at different amperage ratings.

A person skilled in the art appreciates that the power distribution block can come in a variety of shapes and sizes depending on the need and comfort of the user. Further, many changes in the design and placement of components may take place without deviating from the scope of the presently disclosed power distribution block.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A power distribution block for distributing electrical power, said power distribution block comprising:

a conductive plate;

a plurality of first holes and a plurality of second holes, wherein said plurality of first holes and said plurality of second holes are positioned in said plate; and at least one conductive block removably secured to said plate through one of said plurality of first holes and said plurality of second holes, wherein said at least one conductive block comprises an input terminal and at least two output terminals, wherein said at least one conductive block is connected in one or more configurations via one of said plurality of first holes and said plurality of second holes, and wherein said at least one conductive block receives electrical power via said input terminal and distributes the electrical power equally among said at least two output terminals.

2. The power distribution block of claim 1, wherein said plate is configured to operate at 1200 amperes.

3. The power distribution block of claim 1, wherein said plate is configured to operate at or over 600 volts.

4. The power distribution block of claim 1, wherein said at least one conductive block is secured to said plate via fasteners.

5. The power distribution block of claim 1, wherein said plate comprises a removable cover for protecting said at least one conductive block from environment and physical damage.

6. The power distribution block of claim 1, wherein each of said plurality of first holes measures ¼ inch in diameter, and each of said plurality of second holes measures ⅜ inch in diameter.

7. The power distribution block of claim 1, wherein said at least one conductive block is made of a material selected from the group consisting of aluminum, copper, and tin-plated copper.

8. The power distribution block of claim 1, wherein said input terminal secures to input wires, and said at least two output terminals secure to output wires, via screws or clamps in order to prevent overheating and maintain a low-resistance path for current flow.

9. The power distribution block of claim 1, wherein said plate comprises legs, wherein said legs extend downwards from said plate, and wherein said legs are made of insulated material rated for up to 1000 volts.

10. A power distribution block for distributing electrical power, said power distribution block, comprising:

a conductive plate having a top end and a bottom end, wherein said plate is configured to operate at 1200 amperes;

a plurality of first holes and a plurality of second holes provided in said plate, wherein said plurality of first holes and said plurality of second holes are positioned in series from said top end to said bottom end; and at least one conductive block removably secured to said plate through one of said plurality of first holes and said plurality of second holes, wherein said at least one conductive block comprises an input terminal and at least two output terminals, wherein said at least one conductive block is connected in one or more configurations via one of said plurality of first holes and said plurality of second holes, and wherein said at least one conductive block receives electrical power via said input terminal and distributes the electrical power equally among said at least two output terminals.

11. The power distribution block of claim 10, wherein said plate is configured to operate at or over 600 volts.

12. The power distribution block of claim 10, wherein said at least one conductive block is secured to said plate via fasteners.

13. The power distribution block of claim 10, wherein said plate comprises a removable cover for protecting said at least one conductive block from environment and physical damage.

14. The power distribution block of claim 10, wherein each of said plurality of first holes measures ¼ inch in diameter, and each of said plurality of second holes measures ⅜ inch in diameter.

15. The power distribution block of claim 10, wherein said at least one conductive block is made of a material selected from the group consisting of aluminum, copper, and tin-plated copper.

16. The power distribution block of claim 10, wherein said input terminal secures to input wires, and said at least two output terminals secure to output wires, via screws or clamps in order to prevent overheating and maintain a low-resistance path for current flow.

17. The power distribution block of claim 10, wherein said plate comprises legs, wherein said legs extend from said bottom end of said plate, and wherein said legs are made of insulated material rated for up to 1000 volts.

18. A method of providing a power distribution block for distributing electric power, said method comprising the steps of:

providing a conductive plate;

providing a plurality of first holes and a plurality of second holes, said plurality of first holes and said plurality of second holes positioned in series in said plate;

providing at least one conductive block removably secured to said plate through one of said plurality of first holes and said plurality of second holes;

providing an input terminal and at least two output terminals at said at least one conductive block;

connecting said at least one conductive block in one or more configurations via one of said plurality of first holes and said plurality of second holes; and drawing electrical power by said at least one conductive block via said input terminal and distributing the electrical power equally among said at least two output terminals.

19. The method of claim 18, further comprising securing said input terminal to input wires, and said at least two output terminals to output wires via screws or clamps for preventing overheating and maintaining a low-resistance path for current flow.

20. The method of claim 18, further comprising configuring said plate to operate at 1200 amperes, and operate at or over 600 volts.

* * * * *